(12) United States Patent
Webert et al.

(10) Patent No.: US 8,235,163 B2
(45) Date of Patent: Aug. 7, 2012

(54) STEERING BOOST SYSTEM

(75) Inventors: Dirk Webert, Bad Homburg v.d.H. (DE); Doan Van Nguyen, Neu-Anspach (DE)

(73) Assignee: LuK Fahrzeug-Hydraulik GmbH & Co. KG, Bad Homburg v.d.H (DE)

( * ) Notice: Subject to any disclaimer, the term of this patent is extended or adjusted under 35 U.S.C. 154(b) by 873 days.

(21) Appl. No.: 11/664,049

(22) PCT Filed: Aug. 18, 2005

(86) PCT No.: PCT/DE2005/001451
§ 371 (c)(1),
(2), (4) Date: Mar. 28, 2007

(87) PCT Pub. No.: WO2006/034665
PCT Pub. Date: Apr. 6, 2006

(65) Prior Publication Data
US 2007/0251754 A1 Nov. 1, 2007

(30) Foreign Application Priority Data
Sep. 28, 2004 (DE) .................... 10 2004 047 521

(51) Int. Cl.
*B62D 5/065* (2006.01)
*F04B 49/20* (2006.01)
*F04B 49/06* (2006.01)
(52) U.S. Cl. .................. 180/442; 180/422; 417/212
(58) Field of Classification Search .................. 180/421, 180/422, 437, 439, 441, 442, 417; 475/122, 475/114; 417/15, 212
See application file for complete search history.

(56) References Cited

U.S. PATENT DOCUMENTS

| | | | | |
|---|---|---|---|---|
| 1,494,957 A * | 5/1924 | Holdsworth | ................... | 417/212 |
| 2,760,590 A * | 8/1956 | Stolte | ............... | 180/421 |
| 2,768,500 A * | 10/1956 | Ransom | ......................... | 60/406 |
| 2,799,995 A * | 7/1957 | Herman | ......................... | 60/418 |
| 2,807,140 A * | 9/1957 | Ransom | ......................... | 60/428 |
| 2,846,850 A * | 8/1958 | Hall | ................. | 60/418 |
| 2,850,879 A * | 9/1958 | Schnabel | ......................... | 60/413 |
| 2,901,924 A * | 9/1959 | Banker | ......................... | 475/114 |
| 2,936,588 A * | 5/1960 | Van Gerpen | .................. | 417/218 |
| 2,959,070 A * | 11/1960 | Flinn | ................. | 74/664 |
| 2,969,646 A * | 1/1961 | Miller et al. | ................... | 60/447 |
| 3,054,262 A * | 9/1962 | Dinger | ........................ | 60/336 |
| 3,465,842 A * | 9/1969 | Hruska | ........................ | 180/421 |
| 3,865,514 A * | 2/1975 | Lonnemo | ...................... | 417/212 |
| 4,043,419 A * | 8/1977 | Larson et al. | ................. | 180/402 |
| 4,170,438 A * | 10/1979 | Kondo et al. | ................. | 417/223 |
| 4,265,135 A * | 5/1981 | Smirl | ......................... | 74/336 B |
| 4,410,057 A * | 10/1983 | Johnson | ....................... | 180/406 |
| 4,414,809 A * | 11/1983 | Burris | ........................ | 60/424 |
| 4,505,350 A * | 3/1985 | Stockton | ....................... | 180/421 |

(Continued)

FOREIGN PATENT DOCUMENTS

DE 929 530 C 6/1955
(Continued)

*Primary Examiner* — Paul N Dickson
*Assistant Examiner* — Wesley Potter
(74) *Attorney, Agent, or Firm* — Davidson, Davidson & Kappel, LLC (57) ABSTRACT

A hydraulic steering assistance system for vehicles, including a power steering pump and a variable-ratio gear, particularly a booster drive for the power-steering pump wherein the power steering pump hydraulically powers both the hydraulic steering assistance system and the variable-ratio gear.

21 Claims, 6 Drawing Sheets

U.S. PATENT DOCUMENTS

| | | | | |
|---|---|---|---|---|
| 4,538,974 A | * | 9/1985 | Stich et al. | 418/26 |
| 4,710,106 A | * | 12/1987 | Iwata et al. | 417/213 |
| 4,744,542 A | * | 5/1988 | Heusser | 251/30.01 |
| 5,330,393 A | * | 7/1994 | Deppert et al. | 475/154 |
| 5,700,212 A | * | 12/1997 | Meckstroth | 474/70 |
| 6,470,992 B2 | * | 10/2002 | Nissen et al. | 180/429 |
| 2003/0104900 A1 | * | 6/2003 | Takahashi et al. | 477/3 |

FOREIGN PATENT DOCUMENTS

| | | |
|---|---|---|
| DE | 197 01 859 | 10/1998 |
| DE | 198 34 481 | 2/2000 |
| EP | 0 210 930 A | 2/1987 |
| JP | 60109649 A * | 6/1985 |
| JP | 61 175174 | 8/1986 |

* cited by examiner

STEERING BOOST SYSTEM

BACKGROUND

The present invention relates to a hydraulic steering assistance system (servo steering) for motor vehicles having a power-steering pump and a variable-ratio gear, in particular a booster drive for the power-steering pump. Under related art methods, the variable-ratio gear is adjusted by an electric drive, which has the disadvantage of placing heavy demands on the motor vehicle's electrical system and of making for actuators that are slow to respond and that have relatively large dimensions.

SUMMARY OF THE INVENTION

It is, therefore, an object of the present invention to devise a control device for the variable-ratio gear which will overcome these disadvantages.

This objective is achieved by a hydraulic steering assistance system (servo steering) for motor vehicles having a power-steering pump and a variable-ratio gear, in particular a booster drive for the power-steering pump, the power-steering pump hydraulically powering both the hydraulic steering assistance system, as well as a hydraulic system of the variable-ratio gear. In accordance with the present invention, the hydraulic system of the variable-ratio gear is hydraulically connected between the power-steering pump and a flow-control valve device for the steering assistance system.

It is a distinguishing feature of the hydraulic steering assistance system design of the present invention that the hydraulic system of the variable-ratio gear has at least one open-loop control, switching or closed-loop control device, in particular a valve or a restrictor, and a hydraulic control device, in particular a motor or a cylinder. A hydraulic steering assistance system is preferred in which the cylinder may be designed either as a single-action or double-action steering cylinder.

A steering assistance system is also preferred in which a position sensor or a speed sensor is additionally provided for the hydraulic control device of the variable-ratio gear. This has the advantage of enabling the transmission ratio of the variable-ratio gear to be controlled in a closed-loop control circuit. A hydraulic steering assistance system is also preferred, in which an electronic control device is provided for the open-loop control, switching or closed-loop control device.

A hydraulic steering assistance system has the feature that the hydraulic system of the variable-ratio gear is connected downstream of the power-steering pump in parallel to the steering assistance system. As a result, the pressure difference across the hydraulic system of the variable-ratio gear is equal to the pressure difference across the steering assistance system, while the volume flow of the pump is divided between the two systems. A hydraulic steering assistance system is also preferred, in which the switching, open-loop control or closed-loop control device of the hydraulic system of the variable-ratio gear is disposed in the main flow path of the power-steering pump. A hydraulic steering assistance system is also preferred, in which the open-loop control, switching or closed-loop control device is disposed in a bypass flow path (branched-off bypass flow) of the power-steering pump. Here, the advantage is derived that the open-loop control, switching or closed-loop control device may be designed to be smaller in size.

Another hydraulic steering assistance system according to the present invention has the feature that the hydraulic system of the variable-ratio gear is connected downstream of the power-steering pump in series with the steering assistance system. Here, the advantage is derived that the power output of the control device may be controlled independently of the pressure prevailing in the steering assistance system. A hydraulic steering assistance system is also preferred, in which a pressure sensor is disposed upstream of the open-loop control, switching or closed-loop control device. Here, the advantage is derived that a pressure-limiting function is able to be realized by the pressure sensor.

A hydraulic steering assistance system has the feature that the hydraulic control device of the variable-ratio gear automatically resets itself to a minimum speed of the variable-ratio gear in response to corresponding forces, in particular at zero pressure in response to spring forces, or in response to equal pressurization of different-sized effective pressure areas. A hydraulic steering assistance system is also preferred in which the variable-ratio gear constitutes a booster drive, which, at a low speed of the combustion engine, steps up the speed of the power-steering pump and, conversely, at a high speed of the combustion engine, steps down the speed of the power-assisted steering pump, preferably to the same speed as that of the combustion engine.

Another hydraulic steering assistance system has the feature that the open-loop control, switching or closed-loop control device of the variable-ratio gear is pilot controlled. Here, the advantage is derived that smaller magnets may be used for the pilot stage.

A hydraulic steering assistance system is also preferred in which the electronic control device for the variable-ratio gear considers or evaluates additional signals or driving state variables such as speed and/or steering-wheel angular velocity and/or transmission ratio of the steering gear and/or driving speed.

A hydraulic steering assistance system also has the feature that, in the case of a series circuit connection of the steering assistance system and the hydraulic control device of the variable-ratio gear, the open-loop control, switching or closed-loop control device is connected in parallel to the control device.

BRIEF DESCRIPTION OF THE DRAWINGS

The present invention is described in the following with reference to the figures, in which.

DETAILED DESCRIPTION

Figure 1:
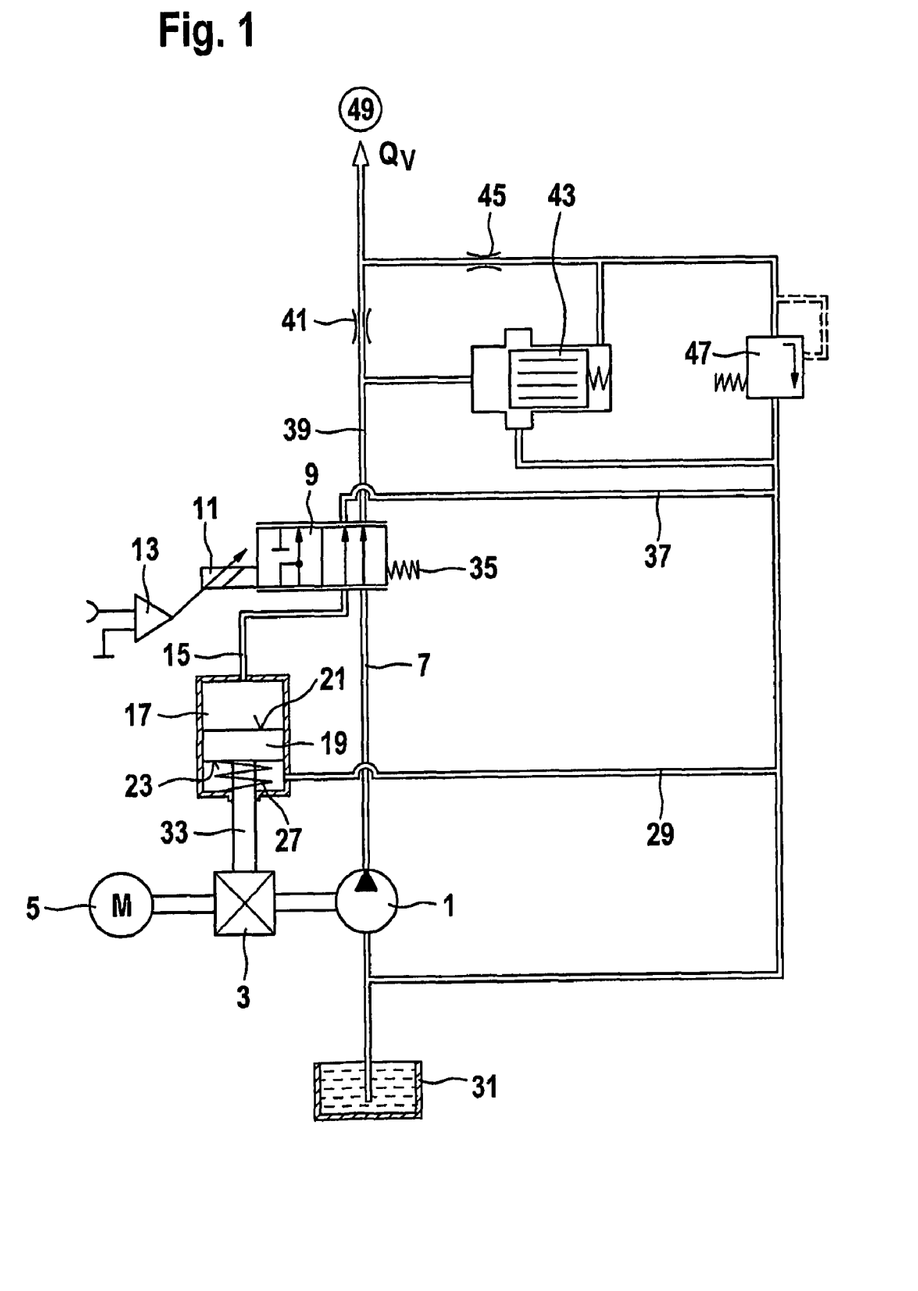
FIG. 1 shows an embodiment of the present invention having a valve being incorporated in the main flow path.

FIG. 1 illustrates the adjustment of the booster drive by a hydraulic cylinder, a parallel circuit connection being provided between the system of the booster drive and the steering assistance system. A power-steering pump 1 communicates via a hydraulically actuated, variable-ratio gear 3, thus the booster drive, with a driving engine 5, typically the combustion engine. At low speeds of combustion engine 5, for example in the idling state, and to respond to high volumetric flow demands of the servo steering, it is intended that booster drive 3 drive power-steering pump 1 at a higher speed to enable it to supply an appropriate volumetric flow for the high steering-wheel angular velocities of the servo steering. At higher combustion engine speeds, power-steering pump 1 only requires lower volumetric flows, so that the power-steering pump may be driven at a reduced speed, and booster drive 3 may, therefore, again be stepped down accordingly. This state may suffice in most operating points of the motor vehicle.

Power-steering pump 1 delivers its volume flow via a connecting line 7 to a valve device 9. Valve device 9 may be an infinitely variable valve, such as a proportional valve, for example, but also a valve actuated by pulse-width modulation or, optionally, even a switching valve. Actuating magnet 11 of valve 9 is activated by an electronic controller 13. In addition, valve 9 communicates via a line 15 with a hydraulic cylinder 17 which constitutes the control device for booster drive 3. The hydraulic cylinder essentially includes a piston 19 having a large effective piston area 21, a smaller piston-ring area 23 and a return spring 27. Where appropriate, other cylindrical designs may likewise be used. Large effective piston area 21 communicates via line 15 with valve 9; smaller ring area 23 via a line 29 with reservoir 31. Thus, pressure is not able to build up on ring area 23, rather the restoring force acting against a pressure force on effective piston area 21 may only be effected by return spring 27. Cylinder 17 is connected via a connecting rod 33 to booster drive 3, in which a certain eccentric adjustment mechanism is typically adjusted from the "centric" position to the "maximum eccentric" position. In the open/close valve position of valve 9 shown here, which is reached in response to the action of a spring 35 against magnet 11, which, in this case, is de-energized, connecting line 15 leading to cylinder 17 communicates likewise at zero pressure via a connecting line 37 with reservoir 31. Thus, in the pressureless position, the control device for booster drive 3 including cylinder 17 is switched to a setting at which the speed of the power-steering pump is not stepped up, rather, as the case may be, at which it is equal to the speed of combustion engine 5. As soon as valve 9 or magnet 11 is energized via electronic control device 13, valve 9 is switched against the force of spring 35 into the other position, or is adjusted to a corresponding intermediate position in such a way that connecting line 7 of power-steering pump delivers both to supply line 15 of the hydraulic cylinder, as well as to a line 39 extending to steering assistance device 49. Disposed subsequently thereto is a flow control device for power-steering pumps, as is known from the related art, having a main-flow restrictor 41, at which a pressure difference is generated to adjust a pressure regulator 43, pressure regulator 43 allowing the volume flow not needed for the steering operation to flow off to reservoir 31, i.e., back into the suction side of pump 1. In addition, the known flow control device for servo steering systems includes a pilot restrictor 45 and a pressure-limiting pilot valve 47, which make it possible, when a maximum pressure is reached, for the flow-control valve system to function as a pilot controlled pressure-limiting system, and for the complete volume flow of power-steering pump 1 to be returned to reservoir 31, i.e., into the suction side of power-steering pump 1. Thus, the volume flow of power-steering pump 1 is divided into an adjusting volume flow for hydraulic cylinder 17 and a delivery volume flow QV which is directed to servo steering 49. With regard to the circuit configuration in FIG. 1, it is worth mentioning that the system of booster drive 3, thus cylinder 17, is connected in parallel to steering assistance device 49, and control valve 9 is disposed in main-flow line 7 of power-steering pump 1 in a series circuit upstream of flow-control valve system 41, 43.

Figure 2:
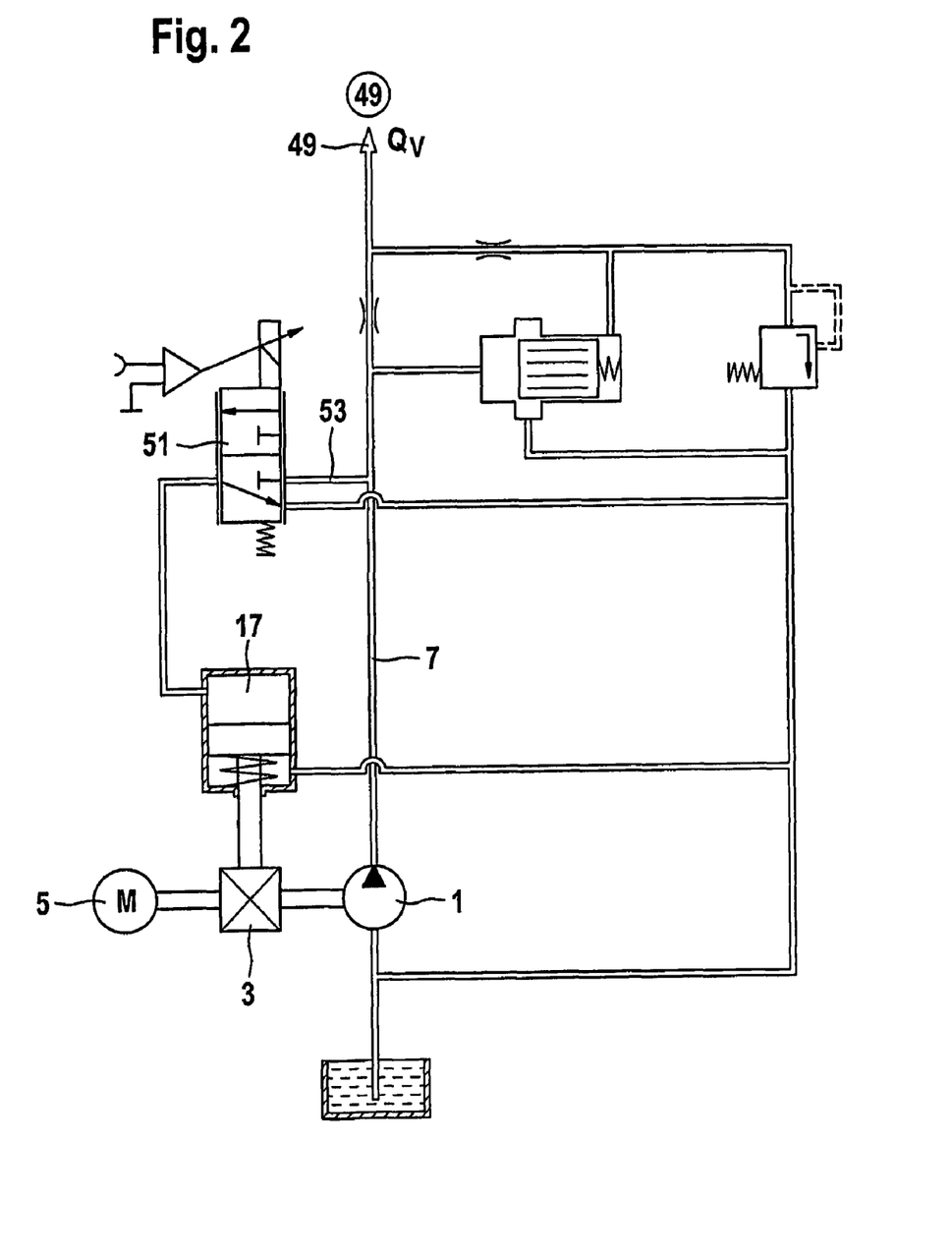
FIG. 2 shows an embodiment of the present invention having a valve being incorporated in the bypass flow path.

Another circuit configuration is shown in FIG. 2. In principle, it does not differ in most of its elements from the illustration of FIG. 1, except for the fact that, here, a control valve 51 is located in a bypass channel 53 leading out from main flow line 7. This means that valve 51 merely needs to be designed to accommodate the magnitude of volume flow to supply control cylinder 17, since the remaining volume flow directed to steering assistance device 49 does not need to flow through valve 51, as it does in FIG. 1 through valve 9. Thus, in this circuit configuration, a smaller valve 51 may be used. All of the other elements correspond in their function to the elements of FIG. 1 and will not be described again for the sake of avoiding repetition.

Figure 3:
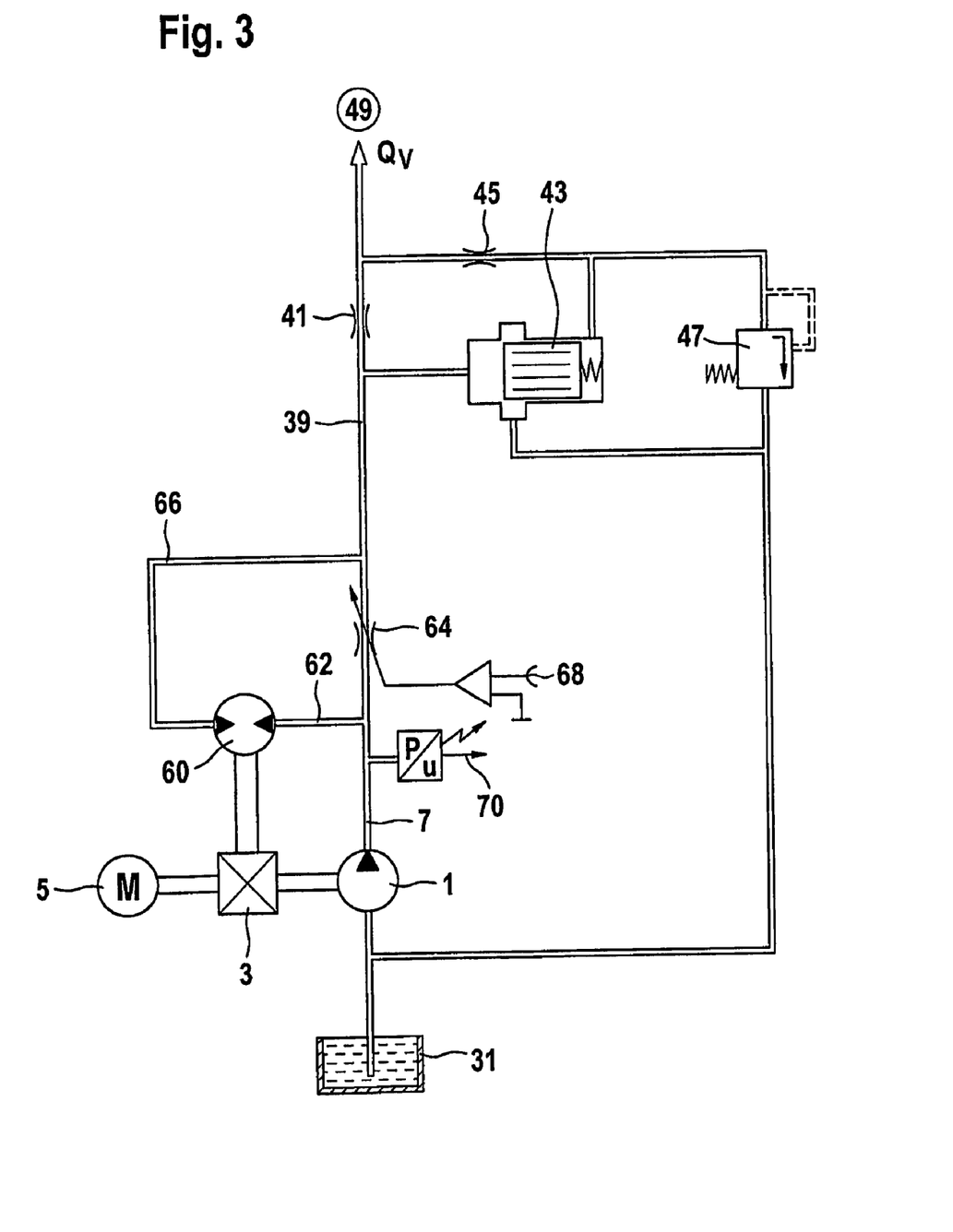
FIG. 3 shows an embodiment of the present invention having a variable restrictor.

FIG. 3 depicts an adjustment of the booster drive by a hydraulic motor, in this case, a series circuit connection being provided between the hydraulic system of the booster drive and the steering assistance system. The hydraulic system of booster drive 3 between driving engine 5 and power-steering pump 1 is represented here by a restrictor 64 and a hydraulic motor 60 which, as the case may be, is able to be operated in both directions of rotation by return devices (not shown here) and is connected via a connecting line 62 to pressure-outlet line 7 of the power-steering pump, as well as via a second line 66 to line 39 upstream of the flow-control valve system. Disposed in the main line between line section 7 and line section 39 is a variable restrictor 64, for example a proportional restrictor valve, which, in this case, may also be adjusted by a suitable control electronics 68. Thus, in this case, the system, including hydraulic motor 60 and the adjusting element, namely variable restrictor 64, is arranged in series upstream of flow-control valve 41, 43, downstream of line 39, the volume flow at flow-control valve 41, 43 then being able to flow to steering assistance device 49 or via pressure regulator 43 back to reservoir 31, i.e., back into the suction side of pump 1. In contrast to the parallel circuits of the hydraulic system of the booster drive for steering assistance device 49 shown in FIGS. 1 and 2, in which the pressure, which is automatically adjusted in steering assistance device 49 in response to the forces acting at the wheels, also affects control system 17 of booster drive 3, thus the pressure prevailing in steering assistance device 49 is equal to the pressure prevailing in control system 17 of booster drive 3, in the circuit configuration in FIG. 3, the pressures of the two systems are realized in such a way that the pressure prevailing in steering assistance device 49 is added to the pressure difference of the system, including hydraulic motor 60 and variable restrictor 64, and both pressure differences, together, produce the pressure at pump 1. The advantage of this circuit configuration is that the requisite pressure difference for actuating hydraulic motor 60 may be set via variable restrictor 64 independently of the pressure difference in steering assistance device 49. By employing a pressure sensor 70, it is possible, for example, to additionally safeguard the maximum pressure to the effect that, in response to exceedance of the maximum pump pressure, variable restrictor 64 opens completely, preventing any further drop in the pressure difference across the system and thereby allowing the pressure-limiting valve, which includes pilot valve 47 and pressure regulator 43, to become active at maximum pressure.

Figure 4:
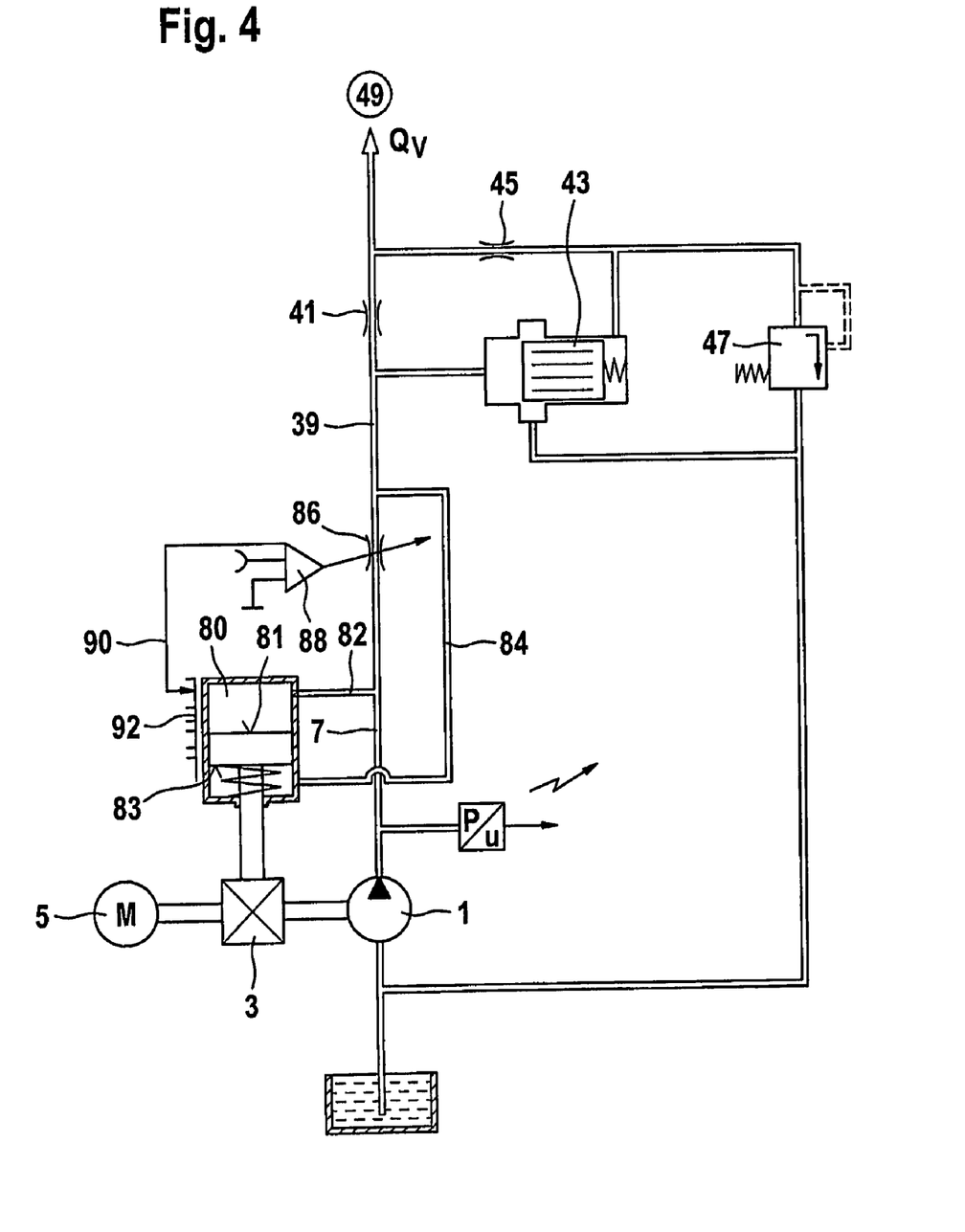
FIG. 4 shows an embodiment of the present invention having a position sensor for the hydraulic cylinder.

Another circuit diagram for a system of the booster drive is shown in FIG. 4, where, to begin with, hydraulic motor 60 of FIG. 3 has been replaced with a double-action control cylinder 80. Control cylinder 80 communicates by way of its large effective piston area 81 via line connection 82 with pump outlet line 7, while a smaller ring area 83 communicates via a line connection 84 with line section 39 upstream of flow-control valve 41, 43, but downstream of a variable restrictor 86, which, in response to actuation by an electronic control device 88, again allows an appropriate pressure difference to be produced across control cylinder 80. However, a control cylinder having two surface areas of equal size may also be used. It is even beneficial when the ring area at the rear piston lateral face is equal in size to the front lateral face, since this ensures that the flow volume is not "swallowed" by the cylinder, thus ruling out any negative effects on the steering performance due to insufficient flow volume. In addition, control cylinder 80 has a sensor device 92, which may be used, for example, to sense the lift of stroke of cylinder 80 and is thus able to transmit a displacement signal 90 indicative thereof to electronic control device 88. Thus, this displacement-sensor feedback 90 allows operation of a closed-loop control circuit, which holds cylinder 80 in a specific position, so that the transmission ratio of booster drive 3 is infinitely adjustable in response to this control device. A control loop of this kind would likewise be conceivable in FIG. 3 at hydraulic motor 60 if appropriate speed sensors were provided at the gear output, respectively speed or angle-of-rotation sensors at hydraulic motor 60. All other functions correspond to the functions already presented with reference to FIG. 3.

Figure 5:
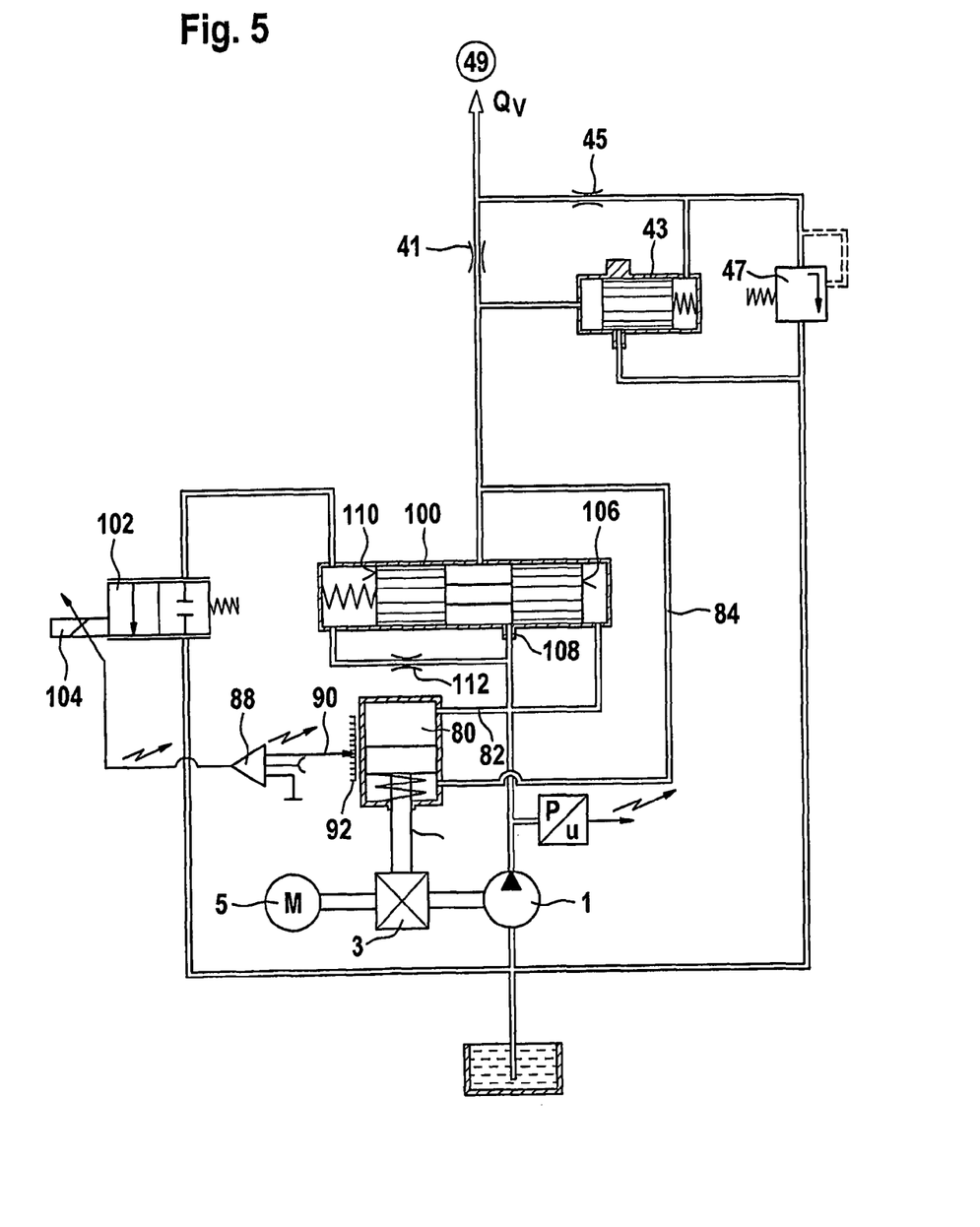
FIG. 5 shows an embodiment of the present invention having a pilot controlled throttle valve.

In contrast to FIG. 4, in FIG. 5, variable restrictor 86 schematically represented in FIG. 4 has been replaced with a pilot controlled throttle valve which includes a main stage 100 and a pilot stage 102. By providing a smaller pilot stage 102, it is possible to precontrol a main stage 100 for large volume flows using a lower-power control magnet 104, thereby eliminating the need for large magnets for actuating valves of equivalent size. To this end, the pressure in line 82, respectively 7, upstream of the actual throttling point 108 of the main stage, acts on main stage 100 via effective piston area 106, while a spring-chamber piston area 110 communicates via a pilot restrictor 112 with the pressure in line 82. Thus, in response to opening of pilot stage 102, the pressure falls off in the spring chamber at area 110 and through restrictor 112 and thus also allows the main stage to be opened. Thus, the throttling device is pilot controlled by a pilot valve 102 in the manner of a classical pressure regulator 100, in response to opening of pilot valve 102, the pressure being allowed to decrease at a pilot restrictor 112, and, as a result, main throttle 100 reducing the size of throttling point 108 in response to the higher pressure acting on piston lateral face 106 as compared to the lower pressure on piston lateral face 110. All other functions are described in the preceding figures. A pressure-limiting function may also be realized at pressure chamber 106 by using a pilot restrictor (not shown here) and an additional pressure-limiting pilot valve (such as pilot 47 in FIG. 1), and by combining the same with the action of the flow controller, including elements 41, 43, 45, 47.

Figure 6:
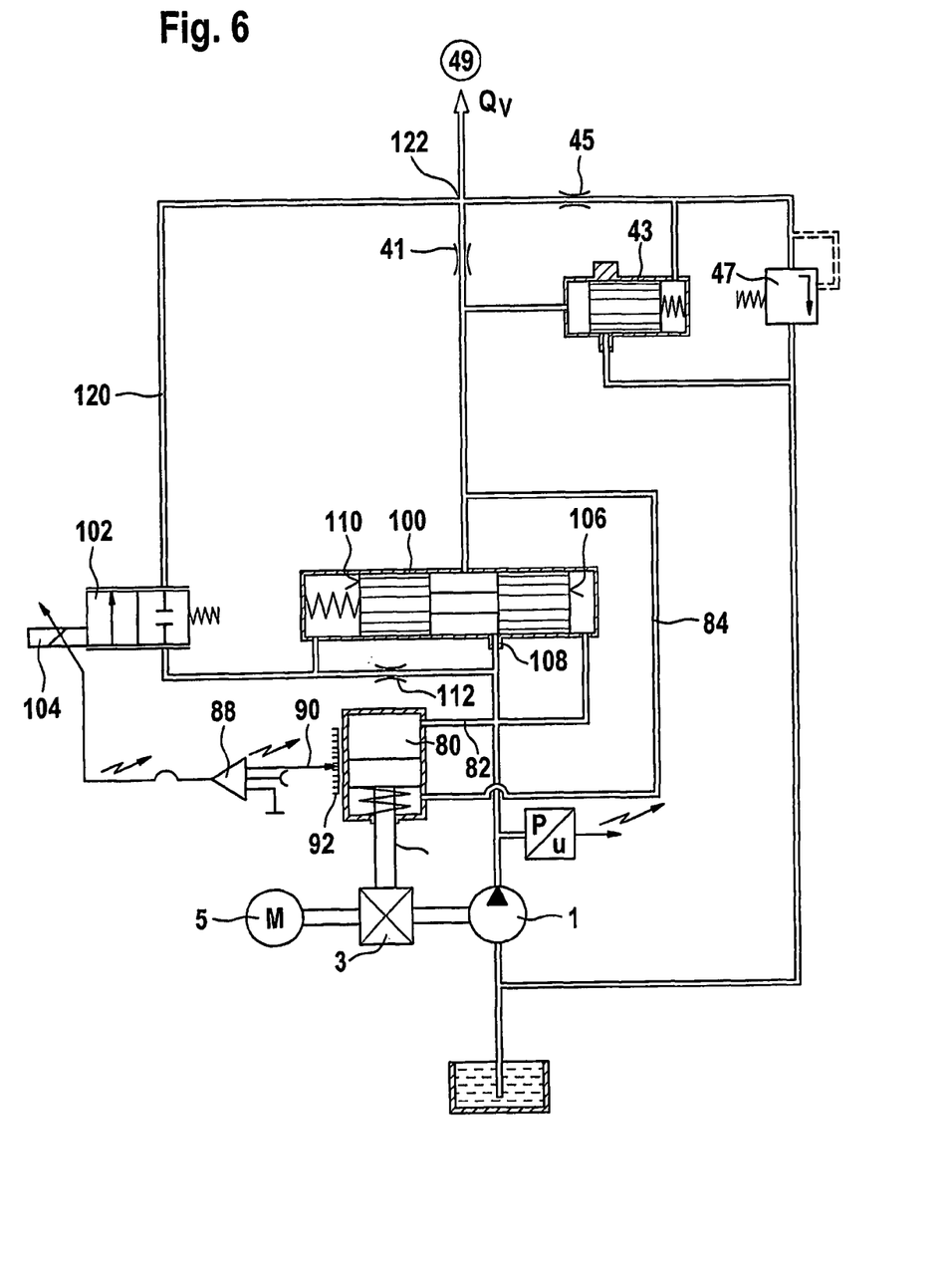
FIG. 6 shows a variant of FIG. 5, the return flow being directed from valve 104 to the steering gear.

The circuit configuration in FIG. 6 differs from that of FIG. 5 in that the return flow of pilot valve 102 is not directed into the reservoir, but to the steering gear, thus downstream of main-flow restrictor 41. To that end, return line 120 leads back to point of intersection 122 downstream of main-flow restrictor 41. This circuit configuration has two advantages: On the one hand, the pressure prevailing across valve 102 does not vary within an overly broad range, making the control simpler. On the other hand, the flow volume is supplied to consuming device 49 (the steering gear) and is not delivered to the reservoir, which, in certain circumstances, has a positive effect on the steering feel.

In all of the electrical control units presented in the descriptions, the adjustment of the variable-ratio gear may be influenced according to the circumstances, as a function of different driving state variables, such as the speed of the combustion engine, the steering-wheel angular velocity, the transmission ratio of the steering gear or the driving speed of the motor vehicle, so that the transmission ratio of the booster drive may be adjusted, and the speed of pump 1 may be varied relative to the speed of driving engine 5, typically of a combustion engine. The inherent advantage of the variants which provide for a series circuit connection of the hydraulic system of booster drive 3 to steering assistance device 49 is that the power output of the hydraulic adjusting element, such as motor 60 or cylinder 80, may be controlled via variable restrictors 68, 86, 100 independently of the system pressure of steering assistance device 49. If an angular-position or displacement sensor 92 or speed sensor is additionally used in the hydraulic control mechanism of the booster drive, the position of piston 81 or of hydraulic motor 60, and thus the transmission ratio of the booster drive may be utilized as the input variable for control unit 88. This makes it possible to control the transmission ratio of the booster drive. This applies in principle to all of the circuit configurations presented here. The systems presented here also have a decisive advantage over known electrical systems, that the electrical systems are slow, require large control elements and place heavy demands on the vehicle electrical system.

LIST OF REFERENCE NUMERALS 1 power-steering pump
3 hydraulically actuated, variable-ratio gear
5 driving engine (combustion engine)
7 connecting line
9 valve device
11 actuating magnet
13 electronic controller
15 line leading to the hydraulic cylinder
17 hydraulic cylinder
19 piston of the hydraulic cylinder
21 large effective piston area of the hydraulic cylinder
23 small piston-ring area of the hydraulic cylinder
27 return spring of the hydraulic cylinder
29 line leading from the small ring area 27 to the reservoir 31
31 reservoir
33 connecting rod to the booster drive
35 spring of valve 9
37 connecting line from valve 9 to reservoir 31
39 line extending to steering assistance system 49
41 main-flow restrictor
43 pressure regulator
45 pilot restrictor
47 pressure-limiting pilot
49 servo steering, steering assistance device
51 control valve
53 bypass channel
60 hydraulic motor
62 connecting line leading to the hydraulic motor
64 variable restrictor
66 second connecting line leading to the hydraulic motor
68 control electronics
70 pressure sensor
80 control cylinder
81 large effective piston area
82 connecting line of the large effective piston area
83 smaller piston-ring area
84 connecting line of the smaller piston-ring area
86 variable restrictor
88 electronic control device
90 displacement signal 92 sensor device
100 main stage of the precontrolled throttle
102 pilot stage of the precontrolled throttle
104 control magnet of the pilot stage
106 effective piston area of the main stage
108 throttling point of the main stage
110 spring chamber at effective piston area of the main stage
112 pilot restrictor
120 return line of valve 102
122 line junction (point of intersection)

What is claimed is:

1. A hydraulic steering assistance system for motor vehicles comprising:
    a power-steering pump;
    a variable-ratio gear coupled between the power-steering pump and a combustion engine;
    a steering assistance device, the power-steering pump hydraulically actuating both the steering assistance device and the variable-ratio gear;
    a flow control device for the steering assistance device; and
    a hydraulic actuator connected between the power-steering pump and the flow-control device, the hydraulic actuator including a hydraulic control device and an electronic control unit controlling the variable-ratio gear as a function of driving state variables by controlling fluid flow of the hydraulic control device.

2. The hydraulic steering assistance system as recited in claim 1 wherein the hydraulic actuator includes at least one open-loop control, switching or closed-loop control device.

3. The hydraulic steering assistance system as recited in claim 2 wherein the hydraulic control device comprises a cylinder, the cylinder having either a single-action or a double-action design.

4. The hydraulic steering assistance system as recited in claim 2 wherein the hydraulic control device includes a position or a speed sensor.

5. The hydraulic steering assistance system as recited in claim 2 wherein the hydraulic control device is connected in parallel to the steering assistance device.

6. The hydraulic steering assistance system as recited in claim 5 wherein the open-loop control, switching or closed-loop control device is disposed in a main flow path of the power-steering pump.

7. The hydraulic steering assistance system as recited in claim 5 wherein the open-loop control, switching or closed-loop control device is disposed in a bypass flow path of the power-steering pump.

8. The hydraulic steering assistance system as recited in claim 5 wherein the hydraulic actuator is connected downstream of the power steering pump.

9. The hydraulic steering assistance system as recited in claim 2 wherein the hydraulic control device is connected in series with the steering assistance device.

10. The hydraulic steering assistance system as recited in claim 9 further comprising a pressure sensor disposed upstream of the open-loop control, switching or closed-loop control device.

11. The hydraulic steering assistance system as recited in claim 9 wherein, in the series circuit connection of the steering assistance device and the hydraulic control device of the variable-ratio gear, the open-loop control, switching or closed-loop control device is connected parallel to the hydraulic control device.

12. The hydraulic steering assistance system as recited in claim 9 wherein the hydraulic actuator is connected downstream of the power steering pump.

13. The hydraulic steering assistance system as recited in claim 2 wherein the hydraulic control device automatically resets itself to a minimum speed of the variable-ratio gear in response to corresponding forces.

14. The hydraulic steering assistance system as recited in claim 13 wherein the corresponding forces include a zero pressure in response to spring forces or to equal pressurization of different sized effective pressure areas.

15. The hydraulic steering assistance system as recited in claim 2 wherein the open-loop control, switching or closed-loop control device is pilot controlled.

16. The hydraulic steering assistance system as recited in claim 2 wherein the open-loop control, switching or closed loop control device comprises a valve or a restrictor.

17. The hydraulic steering assistance system as recited in claim 2 wherein the hydraulic control device is a hydraulic motor or a cylinder.

18. The hydraulic steering assistance system as recited in claim 1 wherein the variable-ratio gear is a booster drive, the booster drive, at a low speed of the combustion engine, stepping up a speed of the power-steering pump and, at a high speed of the combustion engine, stepping down the speed of the power steering pump.

19. The hydraulic steering assistance system as recited in claim 1 wherein the electronic control unit evaluates the driving state variables, the driving state variables including speed, steering-wheel angular velocity, transmission ratio of the variable-ratio gear or driving speed.

20. The hydraulic steering assistance system as recited in claim 1 wherein the variable-ratio gear is a booster drive for power steering.

21. A hydraulic steering assistance system for motor vehicles comprising:
    a power-steering pump;
    a variable-ratio gear coupled between the power-steering pump and a combustion engine;
    a steering assistance device, the power-steering pump hydraulically actuating both the steering assistance device and the variable-ratio gear;
    a flow control device for the steering assistance device;
    a hydraulic control device coupled to the variable-ratio gear;
    an open-loop control, switching or closed-loop control device hydraulically coupled to an output of the power-steering pump and to an input of the hydraulic control device; and
    an electronic control device controlling a fluid flow through the open-loop control, switching or closed-loop control device into the input of the hydraulic control device and a fluid flow of fluid from the power-steering pump into the flow control device as a function of driving state variables.

* * * * *